Fig: 1

United States Patent Office 3,491,858
Patented Jan. 27, 1970

3,491,858
STABILIZING BRAKE
Jean Pomagalski, La Tronche, and Marcel Durand,
Grenoble, France, assignors to Jean S.A. Pomagalski
Filed Dec. 11, 1967, Ser. No. 689,409
Claims priority, application France, Dec. 28, 1966, 5,033;
May 12, 1967, 106,409
Int. Cl. B60t 7/12
U.S. Cl. 188—134                    6 Claims

ABSTRACT OF THE DISCLOSURE

Stabilizing brake for winches in which the lowering speed corresponds with that of an operating device. A cam surface rotates rigidly with the operating device and a feeler rotates rigidly with the shaft of the winch, said feeler controlling the movement of the brake shoes. The cam profile is such that the braking-force increases gradually when the rotation of the feeler gains on the rotation of the cam.

---

The invention relates to brakes used in lowering by gravity, used mainly for hand or electric winches, and the objects of which is the stabilization of the speed of lowering at a speed corresponding with that of a driving wheel by means of which a positive effort is exerted.

Lowering brakes employing the screw and nut belong to the type described above, but they can be used only in the case of high reductions, failing which the effort to be exerted on the driving wheel would be of the order of size of that exerted in lifting.

On the other hand it is well known that shoe-brakes, while permitting the lowering of loads with little operating effort, offer no guarantee of safety if the load develops or is allowed to develop a high speed.

The object of the invention is the creation of a new lowering brake which combines the advantages of the two types, without presenting the disadvantages, that is to say, the creation of a shoe brake which is also a speed stabilizer, and which for this reason offers perfect safety.

According to the invention, the speed stabilizing brake has a cam solidly fixed so as to rotate with the driving component, on the surface of which cam presses at least one feeler solidly fixed so as to rotate with the shaft of which the speed is to be stabilized, the said feeler operating the brake shoes, the profile of the surface of the cam being so calculated that the braking effort increases gradually in the measure in which the rotation of the feeler gains on the rotation of the cam.

Further objects and advantages of the present invention will be apparent from the following description, reference being had to the accompanying drawings, wherein preferred embodiments of the present invention are clearly shown.

Figure 1:
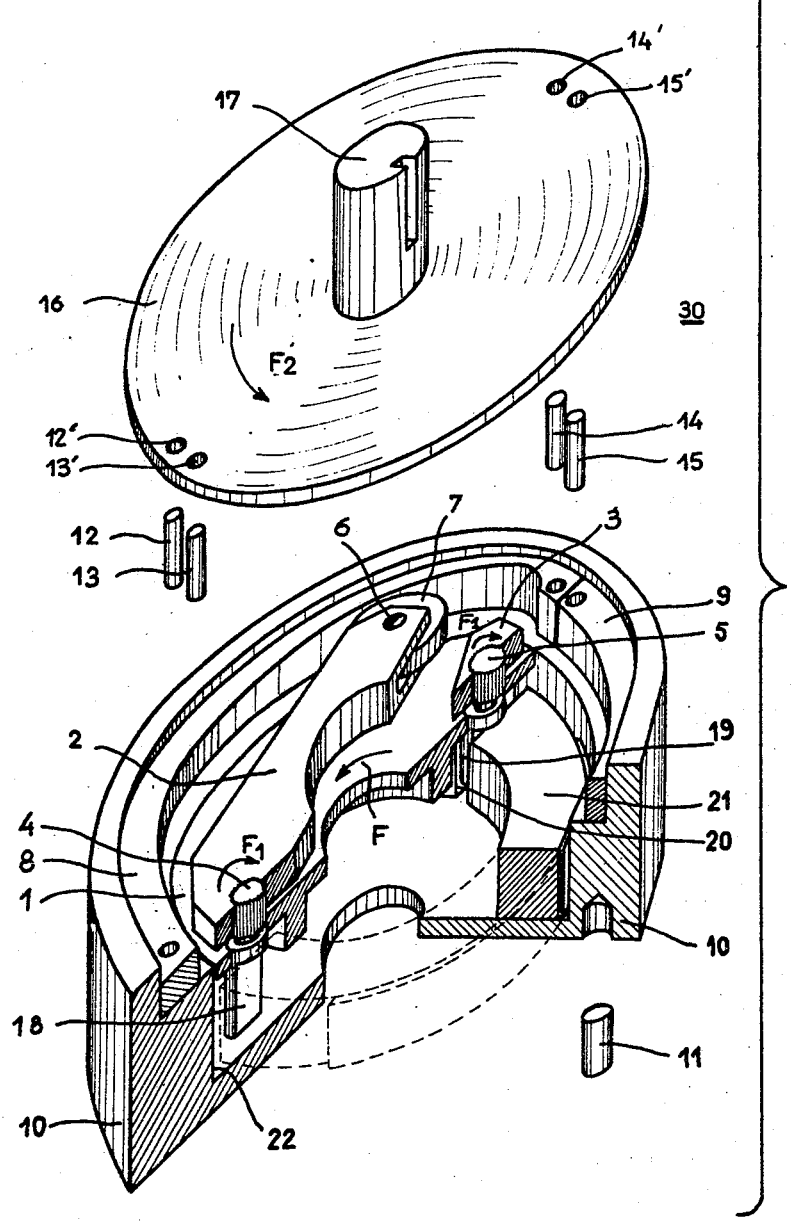
FIGURE 1 is an exploded view in perspective, partially in section in two axial planes at 90°, of the braking device according to the invention.

On FIGURE 1, reference 1 designates a disc solidly fixed to the shaft of which the speed has to be stabilized, and which has not been represented, for the sake of clarity of the drawing.

On disc 1, two levers 2 and 3 are fixed at one end on splined shafts, respectively 4 and 5. Lever 3 is shown only in part on the drawing, but it is fitted symmetrically, in relation to the centre, with lever 2. The other end of each level, 2 and 3, ends in a yoke in which is fitted axle 6 of a wheel 7 which can press against the internal lateral surface of the two half-rings respectively 8 and 9, the exterior lateral cylindrical surface presses against the inner wall of a fixed drum 10, the half-rings 8, 9 being so fitted that they may rotate in relation to fixed drum 10 which itself is fitted by means of bolts and centering pins such as 11 on a fixed frame, for example the frame of a winch. Half-rings 8, 9 have on each of their ends pins 12, 13, 14 and 15 respectively, which are housed in holes 12', 13', 14', 15' provided in a disc 16, which fits into an can rotate in drum 10 for which it serves as a cover. Disc 16 has at its centre a stub shaft 17 coaxial with the shaft to be braked and on which is keyed an operating device not shown, for example a crank, a hand-wheel or even a wrench if this is easily removable, in such a manner that rotation of this operating device is transmitted to cover-disc 16 and then to the half-rings 8, 9 which acting on the end-wheels of levers 2 and 3 provoke the swivelling of these levers and their splined axles 4, 5. In the example chosen to illustrate the invention, the cover-disc 16 is guided by the internal wall of drum 10 but it is obvious that the shaft to be stabilized could be extended and serve as a central guide for cover-disc 16 and the operating device rigidly fixed to this disc.

Each splined shaft 4, 5 has an extension in the form of a cam 18, 19 operating brake-shoes 20, 21. This brake has a drum 22 formed by an internal cylindrical part of drum 10 against which are applied the two shoes 20, 21, the ends of which rest against cams 18, 19. Rotation of shafts 4 and 5 and of cams 18, 19 moved by these shafts from the position represented provokes the separation of shoes 20, 21 and tightening or locking of the brakes so as to stop or slow down the rotation of disc 1 and thus of the shaft carried by this disc.

Disc 1 is presumed to turn in the trigonometric direction indicated by arrow F on the drawing. If this disc turns at the same speed and in the same direction as disc 16, there is no relative displacement of the wheels 7 on the surface with which they are in contact; cams 18, 19 remain in the rest-position represented, and the brake-shoes remain open. However, if disc 1 gains in speed on disc 16 and given that the thickness of half-rings 8, 9 increases in the direction of arrow F, the relative displacement causes shafts 4, 5 to rotate in the direction indicated by arrows $F_1$ and thus the separation of brake-shoes 20, 21 resulting in a tightening or locking of these against drum 10. The profile of surfaces 8, 9 is such that the wheels 7 cannot rotate the half-rings 8, 9 and thus cover 16.

The brake is released when disc 1 tends to lose its advance. As mentioned, the profile of the surfaces on which rest the wheels is so determined as to ensure the irreversibility of the transmission of movement between disc 16 and disc 1, the surfaces being under no circumstances able to be displaced in relation to drum 10 under the effect of stresses exerted on them by wheels 7.

In this example of application, the speed of the shaft carried by disc 1 is therefore exactly the same as that imparted for instance manually to disc 16.

According to a variation which will form the second example of application, the lowering of the load will be accomplished by means of gravity if the manual control device is not held back and is free to turn under the effect of the torque applied to it through the intermediary of the feelers and the surfaces with which they are in contact by the load attached to the cable of the winch. This lowering may be controlled and stopped at any time by braking, or by halting the rotation of the manual operating device.

This particular effect may be obtained by a simple modification of the profile of the inner lateral surface of the half-rings and necessitates no other modification of the winch as described in the first example. According to a preferred method of realization the said rotary manual operating device consists of a simple hand-wheel the rotation of which may be braked by applying the hand to the circumference of the wheel.

The hand-wheel also has an advantage over the crank in that there is no danger of accidents due to blows from a moving crank.

According to an improvement in the invention a locking device makes it possible to immobilize the hand-wheel and the associated profiled surfaces thus preventing any untimely or accidental lowering.

On all the figures identical references have been used to designate parts analogous with those represented in FIGURE 1 and it will be advantageous to refer to this example in order that the functioning be understood.

In the present example, the profile of surface 8, 9 is such that wheels 7 exert a tangential force on these and sufficient torque to overcome the forces of friction opposing the rotation of the half-rings and of disc 16. These forces of friction may be kept at a very low level by the fact of the symmetrical fitting of wheels 7, which result in a cancelation of the radial component forces exerted on the half-rings.

It is easily understood by referenec to the preceding example that by the fact of the rotation of the surfaces of the half-rings in the trigonometrical direction under the effect of the torque which is applied to them by wheels 7, the levers 2 and 3 and their axles 4, 5, swivel in the direction opposite to that of arrows $F_1$, which provokes the coming together and thus the releasing of shoes 20, 21. The brake being released, the load may descend, but in no case can the speed of disc 1 be greater than the speed of rotation of disc 16.

Figure 2:
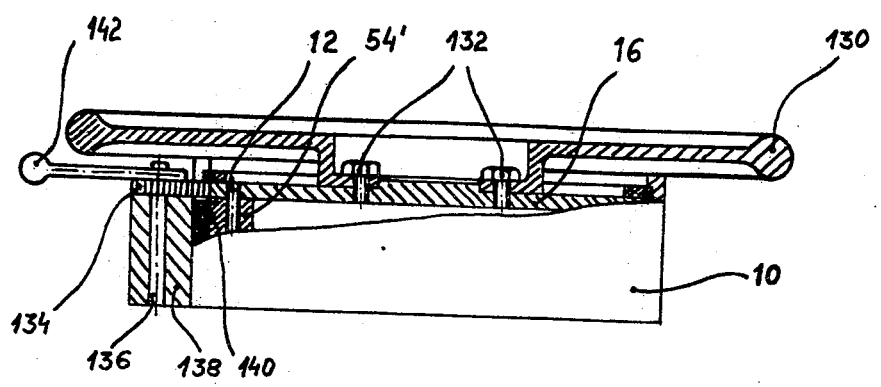
FIGURE 2 is a partial schematic view in profile and in section, illustration a rotary manual driving component according to the invention.
Figure 3:
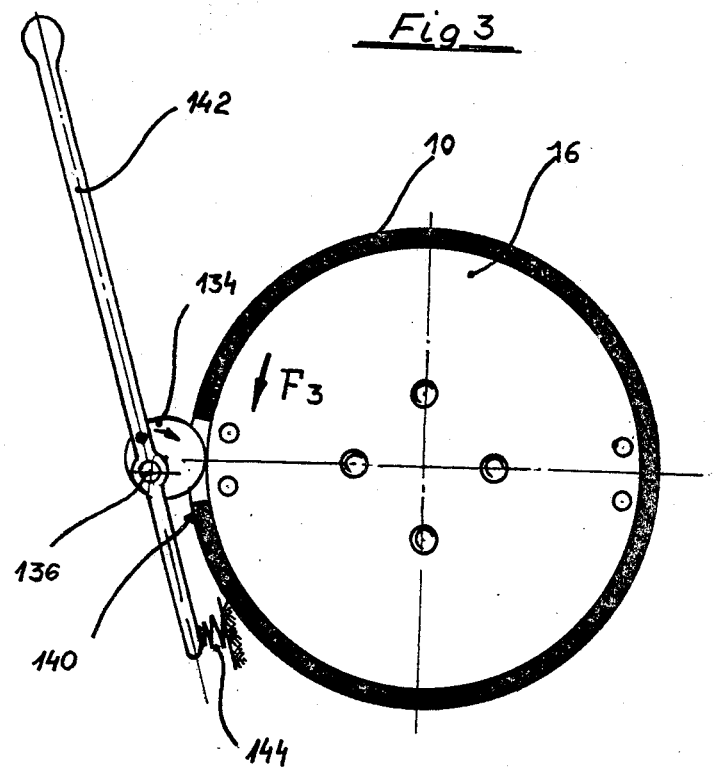
FIGURE 3 is a view in plan showing detail of FIGURE 2 relating to the locking device, it being supposed that the rotary driving element has been removed.

With no particular reference to FIGURES 2 and 3, on which have been shown only those elements which are essential for the understanding of the operating and locking devices illustrated in these figures, an operating hand-wheel 130 is rigidly fixed either by means of bolts 132, for example, or by keying, on shaft 17 (see FIGURE 1) to disc 16.

The rotation of the half-rings and of disc 16 may be controlled by hand-wheel 130. A locking device may be constituted of a wheel 134, an eccentric crank pin 136 of which is articulated in a bearing block 138 rigidly fixed to drum 10. Wheel 134 may be inserted in an orifice 140 provided in drum 10 to come into contact with the circumference of cover-disc 16.

A control lever 142 rigidly fixed to wheel 134 is pulled by compression spring 144, acting on one end, in the direction in which wheel 134 engages with disc 16. It is easily seen that wheel 134 being in contact with disc 16, any movement of the latter in the direction of arrows $F_3$ tends to swivel wheel 134 around eccentric axle 136 and to increase from this fact the binding of wheel 134 which locks disc 16. A movement of disc 16 in the opposite direction to that of arrow $F_3$ is effected freely.

The brake according to the present example operates in the following manner:

For raising the load, this is automatically held by the locking of disc 16 by wheel 134. To lower the load lever 142 is actuated to disengage wheel 134 in opposition to spring 144. Hand-wheel 130, disc 16 and the half-rings then turn under the effect of the torque exerted by the feelers on the surfaces of the half-cams and the load descends at a speed proportional to the speed of rotation of hand-wheel 130.

By braking or possibly by accelerating manually the rotation of hand-wheel 130 it is possible to vary the speed of descent. As soon as lever 142 is freed, wheel 134 locks disc 16 and stops the lowering of the load.

The invention is obviously in no way limited to the methods of realization described, but on the contrary extends over all the variations in realization employing equivalent mechanical devices. The braking device using a drum could for example be replaced by a disc brake, and a different number of brake shoes could be used.

What we claim is:

1. A speed stabilizing brake for winches or analogous devices which is adapted to coact with a shaft to be braked comprising operating means for said brake, a cam surface attached to said operating means and rotating rigidly therewith; disc means attached to said shaft; at least one feeler means mounted on said disc means for rigid rotation with said shaft, said feeler means pressing on said cam surface and controlling the braking force, the profile of said cam surface being such that the braking-force increases progressively with respect to the gain of the rotation of the feeler means over the rotation of the cam surfaces.

2. A brake according to claim 1 wherein the profile of said cam surface is such that said feeler means exert on said surface a torque sufficient to rotate the entire cam in addition to said operating device rigidly attached to said cam surface.

3. A brake according to claim 1 wherein the profile of said cam surface is such that said feeler means exert on said surface a torque insufficient to rotate said cam surfaces and said operating means rigidly attached thereto.

4. A brake according to claim 2 wherein said rotary operating means comprises a hand-wheel.

5. A brake according to claim 2 further comprising locking means adapted to immobilize said shaft by preventing the rotation of said cam surface.

6. A brake according to claim 1 wherein said cam surface is placed on the interior surface of a ring rotatably mounted coaxially with the shaft to be braked and said feeler means comprises levers pivotally mounted upon a disc rigidly attached to said rotating shaft, the pivot points of said levers being adapted to rotate in coordination with the movement of said levers; and cam members attached to said pivot points, said cam members being adapted to activate brake shoes when said pivot points are rotated by the movement of said levers in response to the gain of the rotation of said disc over the rotation of said cam surface.

References Cited

UNITED STATES PATENTS

| 3,080,020 | 3/1963 | Hershey | 188—184 |
| 3,223,208 | 12/1965 | Ryan et al. | 188—184 |

DUANE A. REGER, Primary Examiner

U.S. Cl. X.R.

188—184; 192—8